US012366340B2

(12) United States Patent
Jin

(10) Patent No.: US 12,366,340 B2
(45) Date of Patent: *Jul. 22, 2025

(54) LAMP FOR VEHICLE

(71) Applicant: HYUNDAI MOBIS CO., LTD., Seoul (KR)

(72) Inventor: Min Ji Jin, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,762

(22) Filed: Apr. 29, 2024

(65) Prior Publication Data

US 2024/0280234 A1 Aug. 22, 2024

Related U.S. Application Data

(63) Continuation of application No. 18/077,283, filed on Dec. 8, 2022, now Pat. No. 12,000,557.

(30) Foreign Application Priority Data

Apr. 19, 2022 (KR) ........................ 10-2022-0048369

(51) Int. Cl.

| | |
|---|---|
| *F21S 41/33* | (2018.01) |
| *F21S 41/143* | (2018.01) |
| *F21S 41/25* | (2018.01) |

(52) U.S. Cl.

CPC ............ *F21S 41/33* (2018.01); *F21S 41/143* (2018.01); *F21S 41/25* (2018.01)

(58) Field of Classification Search

CPC .......... F21S 41/33; F21S 41/143; F21S 41/25; F21S 41/151; F21S 41/26; F21S 41/285; F21S 41/321; F21S 41/43; F21S 41/148; F21S 41/265

See application file for complete search history.

(56) References Cited

FOREIGN PATENT DOCUMENTS

KR 102091488 B1 3/2020

*Primary Examiner* — Elmito Breval

(74) *Attorney, Agent, or Firm* — NovoTechIP International PLLC

(57) ABSTRACT

The present disclosure relates to a lamp for a vehicle, and the lamp for the vehicle includes a light source device including a plurality of light sources, each of which emits light, a lens provided to emit light emitted from the light source device forward, and a reflector array including a plurality of reflectors provided to respectively correspond to the plurality of light sources so as to form a plurality of light distribution patterns by reflecting light irradiated from the plurality of light sources. The plurality of light distribution patterns are overlapped to form a low beam pattern.

19 Claims, 8 Drawing Sheets

LAMP FOR VEHICLE

CROSS-REFERENCE TO RELATED APPLICATIONS

This application is a continuation of application from U.S. patent application Ser. No. 18/077,283 filed on Dec. 8, 2022 and titled "LAMP FOR VEHICLE" which claims priority to and the benefit of Korean Patent Application No. 10-2022-0048369, filed in the Korean Intellectual Property Office on Apr. 19, 2022, the entire contents of which are incorporated herein by reference.

TECHNICAL FIELD

The present disclosure relates to a lamp for a vehicle, and more particularly, relate to a vehicle-specific lamp for minimizing the sense of disconnection of a lens.

BACKGROUND

Generally, a vehicle is provided with various types of lamps having a lighting function for easily identifying objects located around the vehicle while the vehicle is driving at night, and a signal function for notifying other vehicles or road users of a driving state of the vehicle.

For example, the vehicle is mainly equipped with a head lamp (headlight) and fog lamp for the purpose of a lighting function, and is further equipped with a turn signal lamp, a tail lamp, a brake lamp, and a side marker for the purpose of a signal function. These vehicle-specific lamps are stipulated by laws and regulations regarding their installation standards and specifications to fully demonstrate each function.

Among vehicle-specific lamps, a head lamp, which forms a low beam pattern or a high beam pattern to secure a driver's front view when the driver is driving at night, plays a very important role in safe driving.

In the meantime, nowadays, the external design of the head lamp and light distribution pattern is as important as the performance of the head lamp. Accordingly, nowadays, a slim lens having a wide shape is being used.

However, a conventional wide-shaped lens is designed to separate an area for forming a near light distribution pattern and an area for forming a far light distribution pattern. As such, as the design progresses to form different focal points in each area depending on characteristics of each area of a lens, there is a difference in shape for each area in the lens, resulting in a disconnected image. As a result, design flaws occur.

Therefore, for design differentiation of vehicle-specific lamps, it is necessary to construct an optical system capable of having continuous images without the sense of disconnection.

SUMMARY

The present disclosure has been made to solve the above-mentioned problems occurring in the prior art while advantages achieved by the prior art are maintained intact.

An aspect of the present disclosure provides a vehicle-specific lamp that minimizes the sense of disconnection due to the shape with a step in a slim lamp.

An aspect of the present disclosure provides a vehicle-specific lamp that enables design differentiation by implementing lens continuity at a low height, thereby increasing product competitiveness.

An aspect of the present disclosure provides a vehicle-specific lamp that sufficiently secures illumination at the same time while satisfying regulations by minimizing the glare of a driver of a preceding vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a light source device including a plurality of light sources, each of which emits light, a lens provided to emit light emitted from the light source device forward, and a reflector array including a plurality of reflectors provided to respectively correspond to the plurality of light sources so as to form a plurality of light distribution patterns by reflecting light irradiated from the plurality of light sources. The plurality of light distribution patterns are overlapped to form a low beam pattern. Assuming that a distance from each of the plurality of light sources to each of the plurality of reflectors respectively corresponding to the plurality of light sources is called a reflection distance, and a distance from each of the plurality of light sources to a focal point of the lens is called a light source distance. The reflection distance is formed differently, and the light source distance is formed differently to form the plurality of light distribution patterns.

The light source device may include a first light source that forms a first light distribution pattern, a second light source disposed farther from an optical axis of the light source device than the first light source and forming a second light distribution pattern, and a third light source disposed farther from the optical axis of the light source device than the second light source and forming a third light distribution pattern. The first light distribution pattern, the second light distribution pattern, and the third light distribution pattern may be formed to have different characteristics from one another. The low beam pattern may be formed by overlapping the first light distribution pattern, the second light distribution pattern, and the third light distribution pattern.

The reflector array may include a first reflector that reflects light irradiated from the first light source, a plurality of second reflectors disposed farther from the optical axis than the first reflector and reflecting light irradiated from the second light source, and a plurality of third reflectors disposed farther from the optical axis than the second reflector and reflecting light irradiated from the third light source.

A second reflection distance (L32), which is a distance from the second light source to a reflective surface of each of the second reflectors, may be formed longer than a third reflection distance (L33), which is a distance from the third light source to a reflective surface of each of the third reflectors. A third reflection distance (L33) may be formed longer than a first reflection distance (L31), which is a distance from the first light source to a reflective surface of the first reflector.

A first light source distance (L21), which is a distance from the first light source to the focal point of the lens, is formed longer than a third light source distance (L23), which is a distance from the third light source to the focal point of the lens. A third light source distance (L23) is formed longer than a second light source distance (L22), which is a distance from the second light source to the focal point of the lens.

The lamp for the vehicle may further include a shield positioned between the light source device and the lens and blocking a part of light irradiated from the light source device. The shield may be positioned at the focal point of the lens.

The lens may include a first lens disposed in front of the light source device and formed to have a thinner thickness toward both sides end based on left and right directions, and a second lens disposed in front of the first lens and formed bent so as to be disposed rearward from one end to the other end based on the left and right directions.

The lens may form a single focus by the first lens and the second lens.

A left-right width of the first lens may be formed to be identical to a left-right width of the second lens.

The second lens may be formed to get closer to the light source device from a center of the vehicle to an outside of the vehicle.

A horizontal curvature of an incident surface of the first lens may be smaller than a horizontal curvature of an emission surface of the first lens.

A vertical curvature of an incident surface of the first lens may be greater than a vertical curvature of an emission surface of the first lens.

A horizontal curvature of an incident surface of the first lens may be different from a vertical curvature of the incident surface of the first lens. A horizontal curvature of an emission surface of the first lens may be different from a vertical curvature of the emission surface of the first lens.

A horizontal curvature of an incident surface of the second lens may be identical to a horizontal curvature of an emission surface of the second lens. A vertical curvature of the incident surface of the second lens may be greater than a vertical curvature of the emission surface of the second lens.

A horizontal curvature of an incident surface of the second lens may be different from a vertical curvature of the incident surface of the second lens. A horizontal curvature of an emission surface of the second lens may be different from a vertical curvature of the emission surface of the second lens.

In the second lens, a thickness in a direction from an incident surface toward an emission surface may be uniformly formed over an entire area.

A distance (h22) from an upper end of an emission surface of the second lens to a lower end of the emission surface of the second lens may be smaller than a distance from an upper end of each of an incident surface of the second lens, an emission surface of the first lens, and an incident surface of the first lens to a lower end of each of the incident surface of the second lens, the emission surface of the first lens, and the incident surface of the first lens.

The first lens and the second lens may include inclined surfaces on an upper surface and a lower surface such that the upper surface and the lower surface are convex.

An upper surface of the first lens may include a first upper inclined surface extending from an upper end portion of an incident surface and formed to be inclined upward, an upper horizontal surface horizontally extending from an end portion of the first upper inclined surface, and a second upper inclined surface formed to be inclined downward from an end portion of the upper horizontal surface toward an emission surface. A lower surface of the first lens may include a first lower inclined surface extending from a lower end portion of the incident surface and formed to be inclined downward, a lower horizontal surface horizontally extending from an end portion of the first lower inclined surface, and a second lower inclined surface formed to be inclined upward from the lower horizontal surface toward the emission surface.

An upper surface of the second lens may include a first upper gradient surface extending from an upper end portion of an incident surface and formed to be inclined upward, and a second upper gradient surface formed to be inclined downward from the first upper gradient surface toward an emission surface. A lower surface of the second lens may include a first lower gradient surface extending from a lower end portion of the incident surface and formed to be inclined downward, and a second lower gradient surface formed to be inclined upward from the first lower gradient surface toward the emission surface.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, an embodiment of the present disclosure will be described in detail with reference to the accompanying drawings.

First of all, embodiments described below are suitable for understanding technical characteristics of a lamp for a vehicle according to an embodiment of the present disclosure. However, the present disclosure is applied only to embodiments described below, or technical features of the present disclosure are not limited by the described embodiments. Various modified implementations are possible within the technical scope of the present disclosure.

Figure 1:
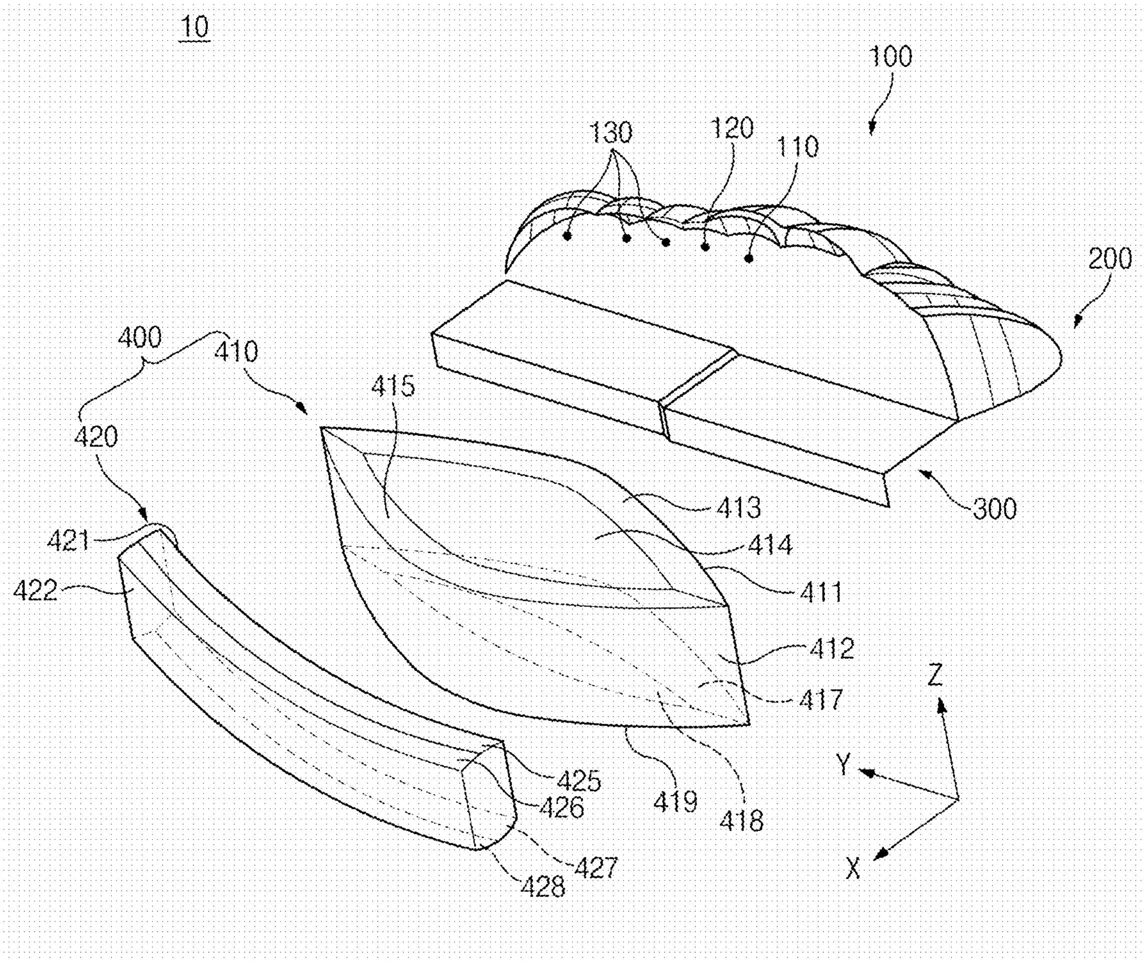
FIG. 1 is a perspective view showing a lamp for a vehicle, according to an embodiment of the present disclosure.
Figure 2:
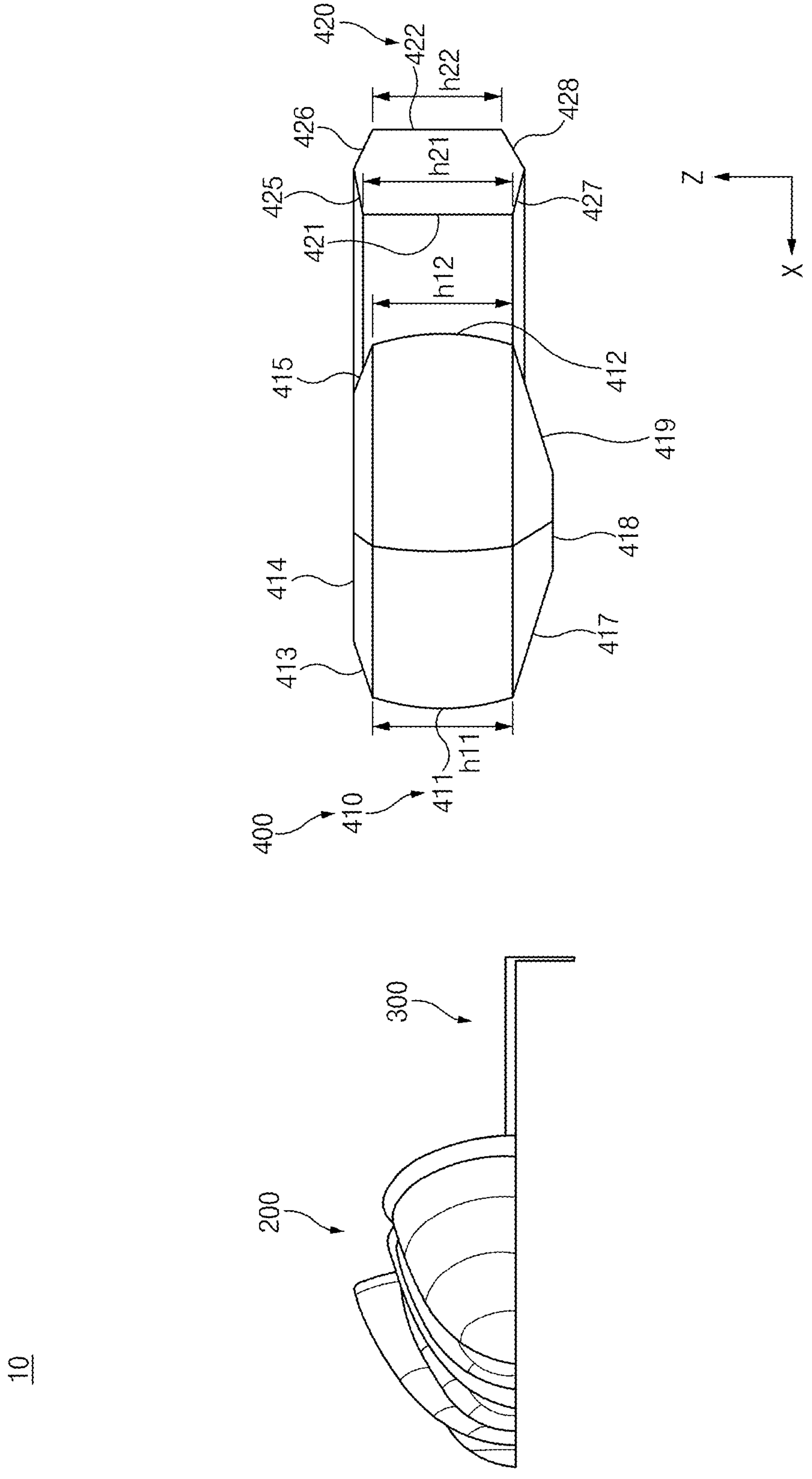
FIG. 2 is a side view showing a side surface of a lamp for a vehicle, according to an embodiment of the present disclosure.
Figure 3:
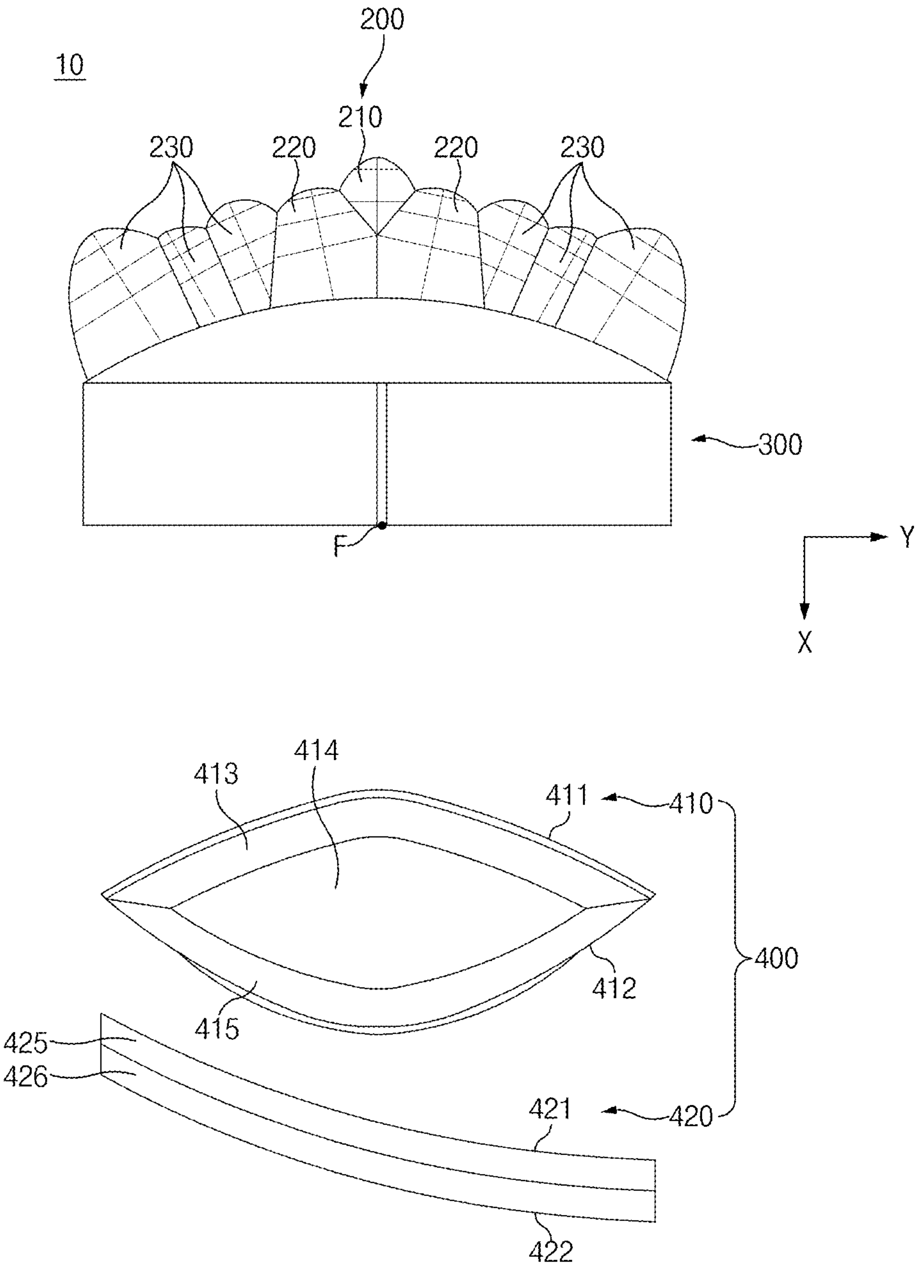
FIG. 3 is a diagram of a lamp for a vehicle when viewed from above an upper portion, according to an embodiment of the present disclosure.
Figure 4:
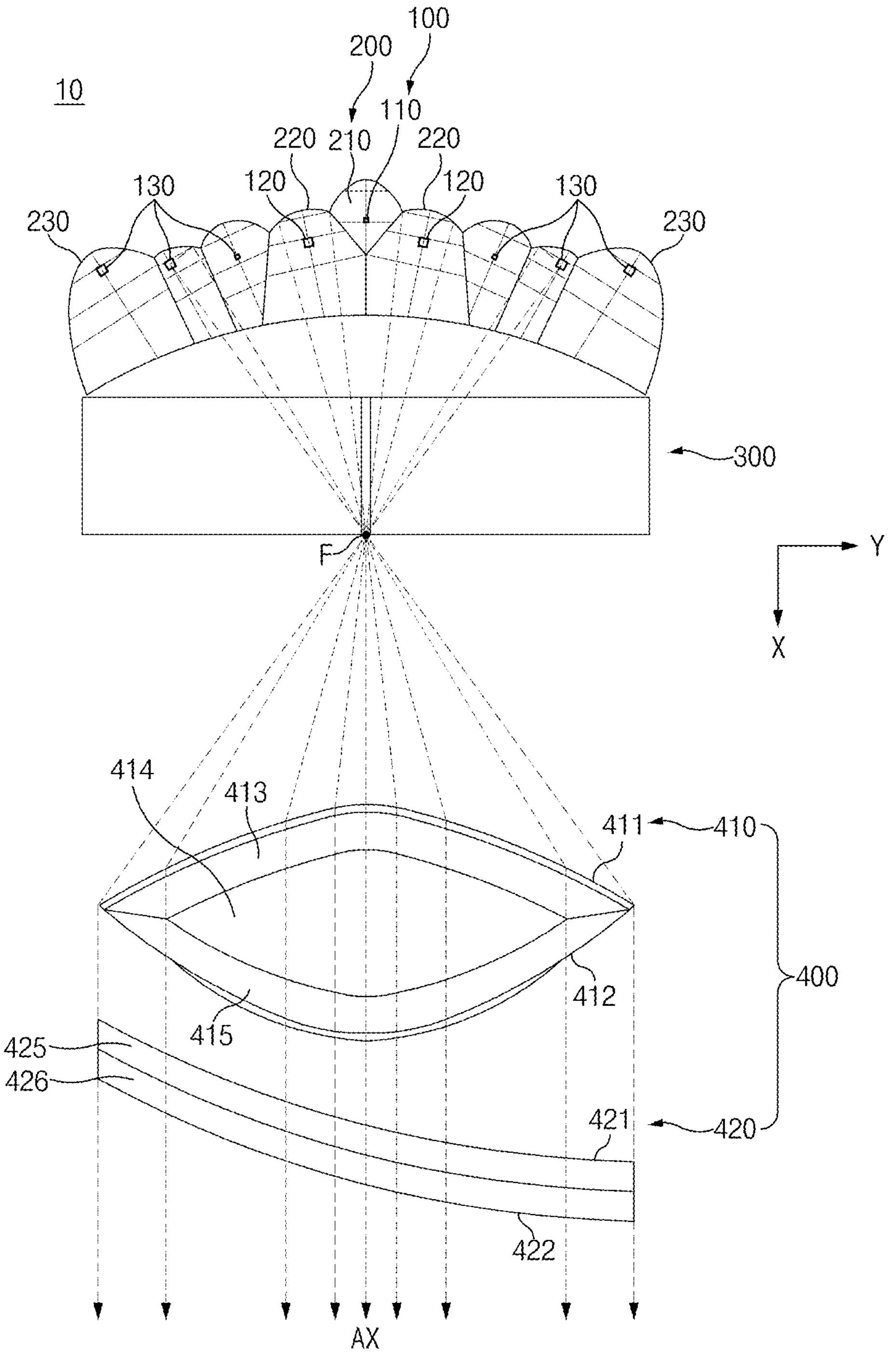
FIG. 4 is a diagram illustrating a vehicle-specific lamp according to an embodiment of the present disclosure, and is a diagram further illustrating a movement path of light emitted from a light source in FIG. 3.
Figure 5:
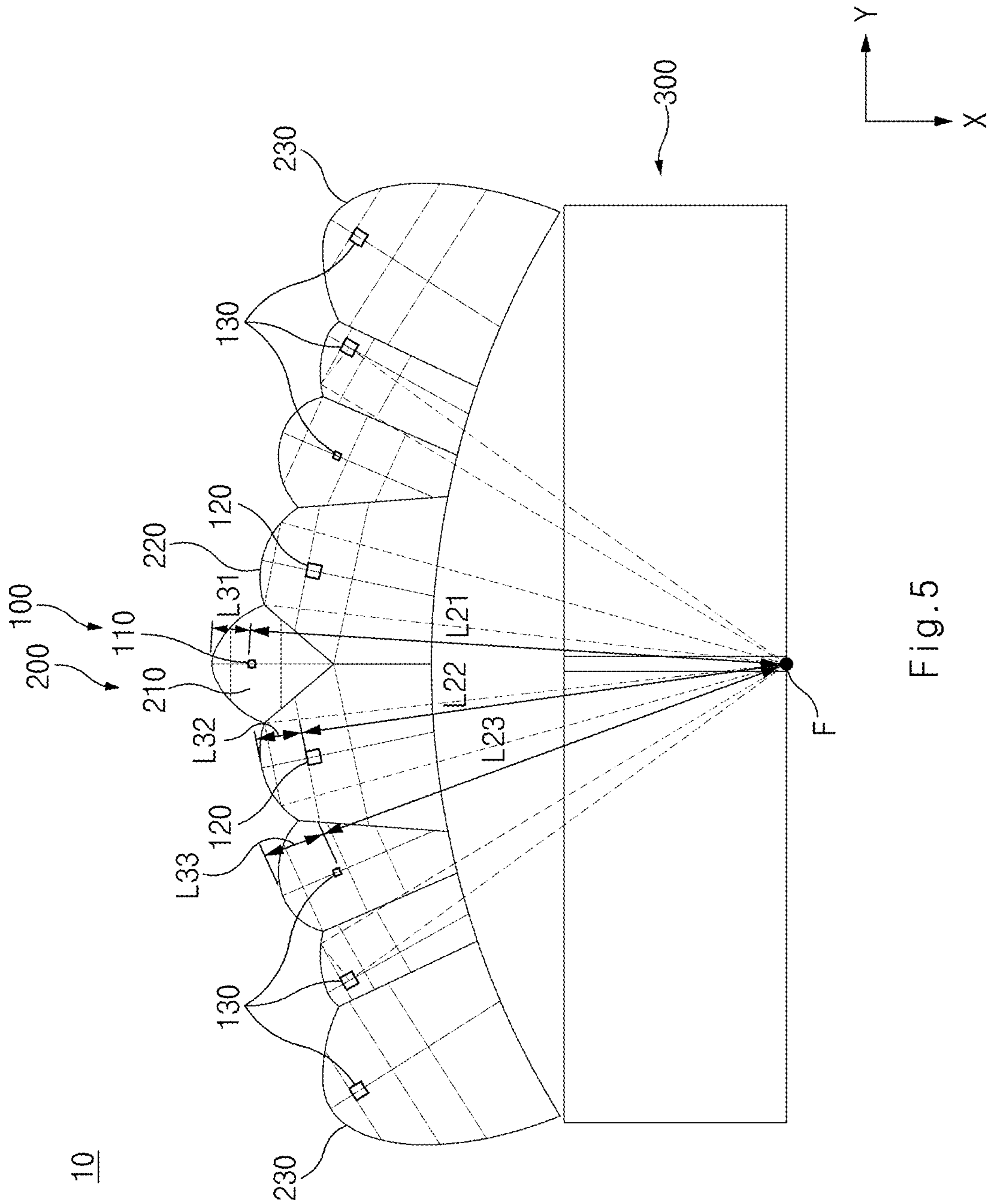
FIG. 5 is an enlarged view of a part of FIG. 4, and is a diagram for describing a reflection distance and a light source distance for forming each light distribution pattern.
Figure 6:
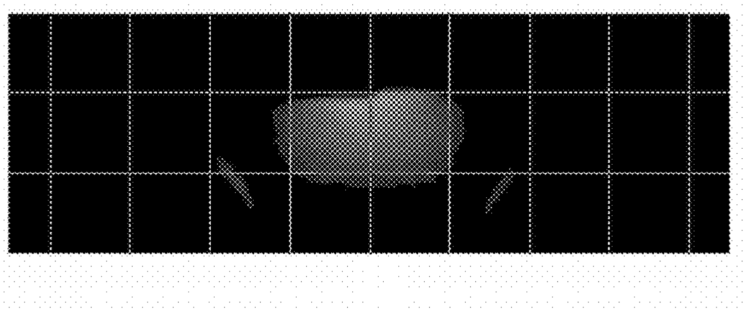
FIG. 6 is a diagram showing a first light distribution pattern by a lamp for a vehicle, according to an embodiment of the present disclosure.
Figure 7:
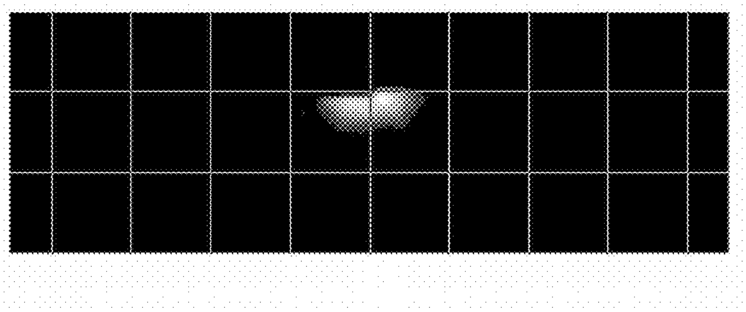
FIG. 7 is a diagram showing a second light distribution pattern by a lamp for a vehicle, according to an embodiment of the present disclosure.
Figure 8:
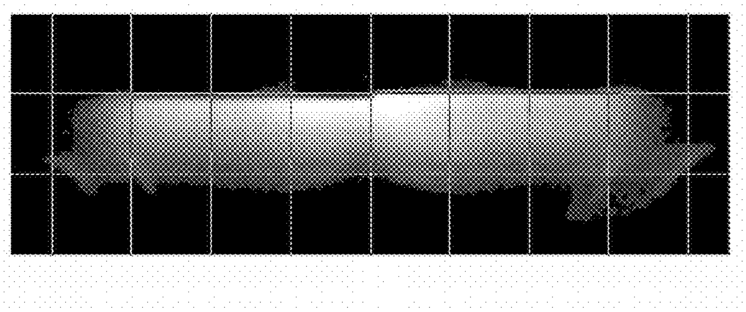
FIG. 8 is a diagram showing a third light distribution pattern by a lamp for a vehicle, according to an embodiment of the present disclosure.

FIG. 1 is a perspective view showing a lamp for a vehicle, according to an embodiment of the present disclosure. FIG. 2 is a side view showing a side surface of a lamp for a vehicle, according to an embodiment of the present disclosure. FIG. 3 is a diagram of a lamp for a vehicle when viewed from above an upper portion, according to an embodiment of the present disclosure. FIG. 4 is a diagram illustrating a vehicle-specific lamp according to an embodiment of the present disclosure, and is a diagram further illustrating a movement path of light emitted from a light source in FIG. 3. FIG. 5 is an enlarged view of a part of FIG. 4, and is a diagram for describing a reflection distance and a light source distance for forming each light distribution pattern. FIG. 6 is a diagram showing a first light distribution pattern by a lamp for a vehicle, according to an embodiment of the present disclosure. FIG. 7 is a diagram showing a second light distribution pattern by a lamp for a vehicle, according to an embodiment of the present disclosure. FIG. 8 is a diagram showing a third light distribution pattern by a lamp for a vehicle, according to an embodiment of the present disclosure.

Referring to FIGS. 1 to 8, a vehicle-specific lamp 10 according to an embodiment of the present disclosure includes a light source device 100, a lens 400, and a reflector array 200. Moreover, the vehicle-specific lamp 10 according to an embodiment of the present disclosure may further include a shield 300.

The light source device 100 includes a plurality of light sources for emitting light.

Here, various light emitting elements or devices may be used as the light source. For example, the light source may be a light emitting diode (hereinafter referred to as "LED"), but is not limited thereto, and various lamps such as laser diode, bulb, halogen, and xenon (HID) may be applied thereto.

The light source device 100 may include a plurality of light sources, and the number and arrangement of the light sources may be determined depending on design specifications of a lamp. For example, the plurality of light sources may be arranged in an arc shape based on left and right directions. However, the arrangement of a plurality of light sources is not limited thereto.

The lens 400 is provided to allow the light irradiated from the light source device 100 to transmit or emit to the front.

For example, the lens 400 may include a first lens 410 and a second lens 420. Hereinafter, for convenience of description, a direction, which is a horizontal direction and which is perpendicular to an optical axis direction (X-axis direction) is referred to as a "left-right direction" (Y-axis direction). A direction perpendicular to both the optical axis direction (X-axis direction) and the left-right direction (Y-axis direction) is referred to as a "vertical direction" (Z-axis direction).

The first lens 410 may be disposed in front of the light source device 100. The second lens 420 may be disposed in front of the first lens 410. For example, the second lens 420 disposed in front may be formed curved, and may be formed continuously without a stepped portion. The vehicle-specific lamp 10 according to an embodiment of the present disclosure may be differentiated in design by implementing the continuity of the second lens 420, which is positioned in the front and forms the appearance of the vehicle-specific lamp 10.

The reflector array 200 includes a plurality of reflectors provided to respectively correspond to a plurality of light sources so as to form a plurality of light distribution patterns by reflecting light irradiated from the plurality of light sources. Moreover, the plurality of light distribution patterns are overlapped to form a low beam pattern.

Assuming that a distance from each of the plurality of light sources to each of the plurality of reflectors corresponding thereto is called a reflection distance, and a distance from each of the plurality of light sources to a focal point 'F' of the lens 400 is called a light source distance, each reflection distance may be formed differently, and each light source distance may be formed differently to form a plurality of light distribution patterns.

For example, the plurality of reflectors may be integrally formed by being connected to each other. The reflector array 200 in which the plurality of reflectors are coupled may be formed in an arc shape so as to correspond to the arrangement of the plurality of light sources. That is, as one of the plurality of reflectors is disposed farther from the optical axis AX, the reflector array 200 may be formed adjacent to the lens 400.

In this case, the plurality of light sources and the plurality of reflectors corresponding thereto may have different reflection distances from one another. Also, the plurality of light sources may have different light source distances, each of which reaches the focal point 'F' of the lens 400. Accordingly, the plurality of light distribution patterns may be formed to have different characteristics.

Meanwhile, the present disclosure may further include the shield 300. The shield 300 may be positioned between the light source device 100 and the lens 400 and may be provided to block a part of light emitted from the light source device 100. Here, the shield 300 may be disposed at the focal point 'F' of the lens 400. Also, a cut-off line may be formed in a low beam pattern by the shape of the shield 300.

In detail, the light source device 100 may include a first light source 110, a second light source 120, and a third light source 130.

The first light source 110 may be provided to form a first light distribution pattern. For example, the first light source 110 may be provided as one and may be disposed in the center based on the left and right directions. The second light source 120 may be provided to be disposed to be farther from the optical axis AX of the light source device 100 than the first light source 110 and to form a second light distribution pattern. The third light source 130 may be provided to be disposed to be farther from the optical axis AX of the light source device 100 than the second light source 120 and to form a third light distribution pattern.

Furthermore, the first light distribution pattern, the second light distribution pattern, and the third light distribution pattern may be formed to have different characteristics from one another. Besides, the low beam pattern may be formed by overlapping the first light distribution pattern, the second light distribution pattern, and the third light distribution pattern.

Here, a distance between (from) the focal point 'F' of the lens 400 and (to) an incident surface 411 of the first lens 410 is referred to as a "focal distance L1". Moreover, a distance from the first light source 110 to the focal point 'F' of the lens 400 is referred to as a "first light source distance L21"; a distance from the second light source 120 to the focal point 'F' of the lens 400 is referred to as a "second light source distance L22"; and, a distance from the third light source 130 to the focal point 'F' of the lens 400 is referred to as a "third light source distance L23".

The reflector array 200 may include a first reflector 210, a second reflector 220, and a third reflector 230.

The first reflector 210 may be provided to reflect light emitted from the first light source 110. The first reflector 210 may form the first light distribution pattern together with the first light source 110. Here, a distance from the first light source 110 to the reflective surface of the first reflector 210 is defined as a first reflection distance L31.

The second reflector 220 may be disposed to be farther from the optical axis AX than the first reflector 210 and to reflect light emitted from the second light source 120, and there may be a plurality of second reflectors 220. For example, the second reflectors 220 may be provided as a pair on the left and right sides of the first reflector 210.

The second reflector 220 may form the second light distribution pattern together with the second light source 120. Here, a distance from the second light source 120 to the reflective surface of the second reflector 220 is defined as a second reflection distance L32.

The third reflector 230 may be disposed to be farther from the optical axis AX than the second reflector 220 and to reflect light emitted from the third light source 130, and there may be the plurality of third reflectors 230. For example, the three third reflectors 230 may be provided on the left side of the second reflector 220, and the three third reflectors 230 may be provided on the right side of the second reflector 220. However, the number of the third reflectors 230 is not limited thereto.

The third reflector 230 may form a third light distribution pattern together with the third light source 130. Here, a distance from the third light source 130 to the reflective surface of the third reflector 230 is defined as a third reflection distance L33.

Here, the fact that the first light distribution pattern, the second light distribution pattern, and the third light distribution pattern have different characteristics from one another means that pattern images of light, which is irradiated by the first light source 110 and the second light source 120 and then emitted by the lens 400, are different from each other. This may be implemented, for example, by differences in a size of the light emitting surface of each light source and an interval between each light source and the reflector array 200.

For example, the second light distribution pattern implemented by the second light source 120 may be a light distribution pattern (hot zone) to secure the view of the central area in front (see FIG. 7). Also, the third light distribution pattern implemented by the third light source 130 may be a light distribution pattern (wide zone) for securing visibility of the surrounding area in front and visibility during turning (see FIG. 8). Besides, the first light distribution pattern implemented by the first light source 110 may be a light distribution pattern for securing illumination.

Furthermore, the first light distribution pattern, the second light distribution pattern, and the third light distribution pattern may be integrated to form a low beam pattern, which may be implemented by the light source device 100 and the reflector array 200.

In detail, the second light distribution pattern according to an embodiment of the present disclosure corresponds to a hot zone, which is a high-illumination area of the low beam pattern. However, when the second light distribution pattern, which is the high-illumination area, is widely distributed, the light generated from the second light source 120 may be reflected by a road surface and may cause glare to others. In this case, laws and regulations regulating the maximum illumination of a beam pattern formed by an area may be violated. In the past, to comply with the law, the illumination has been adjusted by corroding a part of the reflective surface forming a light pattern of the corresponding area. However, in this case, optical loss occurs in the corresponding area.

According to an embodiment of the present disclosure, through the design of the arrangement of a plurality of light sources and the arrangement and shape of a plurality of reflectors, the illumination of the high-illumination area is sufficiently secured at the same time while regulations are satisfied by minimizing the glare of a driver of a preceding vehicle. In detail, according to an embodiment of the present disclosure, it is possible to narrow an area of the second light distribution pattern serving as the existing hot zone, and to secure the illuminance of the high-illumination area by additionally irradiating the first light distribution pattern to the hot zone area. Here, because the first light distribution pattern does not have higher luminance than the second light distribution pattern, it is possible not to cause glare to the other vehicle due to the first light distribution pattern while the illuminance of the hot zone is increased.

In detail, the second reflection distance L32 that is a distance from the second light source 120 to the reflective surface of the second reflector 220 may be greater than the third reflection distance L33, which is a distance from the third light source 130 to the reflective surface of the third reflector 230.

Moreover, the third reflection distance L33 may be greater than the first reflection distance L31, which is a distance from the first light source 110 to the reflective surface of the first reflector 210. That is, the reflection distance, which is the distance from a light source to a reflector, may be prepared to be large in order of the first reflection distance L31, the third reflection distance L33, and the second reflection distance L32.

Furthermore, the first light source distance L21, which is the distance from the first light source 110 to the focal point 'F' of the lens 400, may be greater than the third light source distance L23, which is a distance from the third light source 130 to the focal point 'F' of the lens 400.

Also, the third light source distance L23 may be greater than the second light source distance L22, which is a distance from the second light source 120 to the focal point 'F' of the lens 400. That is, a light source distance, which is the distance from the light source to the focal point 'F' of the lens 400, may be provided to increase in the order of the first light source distance L21, the third light source distance L23, and the second light source distance L22.

As a reflection distance, which is a distance from the light source to the reflective surface of the reflector increases, the image of the light distribution pattern may decrease, and the illuminance may increase. Moreover, as a light source distance, which is a distance from the light source to the focal point 'F' of the lens 400 decreases, the image size of the light distribution pattern may decrease, and the illuminance may increase.

Accordingly, because the second light source distance L22 is formed to be shortest and the second reflection distance L32 is formed to be longest, the size of the second light distribution pattern image having high illuminance may be formed to be small. Accordingly, regulations may be satisfied by minimizing the glare of a driver of the other vehicle due to light generated by the second light source 120 is reflected on a road surface.

Furthermore, because the first light source distance L21 is formed to be longest and the first reflection distance L31 is formed to be shortest, the first light distribution pattern may not have high luminance, and thus the glare of a driver of the other vehicle may be minimized. At the same time, because the size of the light distribution pattern image increases, illuminance of a hot zone may be sufficiently secured.

Here, the first light distribution pattern does not require high luminance, and thus the effective area of the reflective surface may be small. Accordingly, the first reflector 210 may be disposed in the center of the reflector array 200, and there may be the single first reflector 210. Moreover, because the second light distribution pattern requires high luminance, and thus it is necessary to secure the effective area of the reflective surface. Accordingly, the second reflector 220 may be disposed on left and right sides of the first reflector 210, and there may be the two second reflectors 220.

In the meantime, as described above, a light distribution pattern (wide zone) may be formed to secure visibility of a front peripheral area and visibility during turning by forming the third light distribution pattern having the third reflection distance L33 and a third light source distance.

Here, to sufficiently secure the left-right width of the third light distribution pattern, the third reflector 230 may be disposed on both left and right sides of the second reflector 220, and there may be the three or more third reflectors 230.

However, the number and shapes of the first reflector 210, the second reflector 220, and the third reflector 230 may not be limited to those described above, and may be changed in various ways depending on the design specifications of the vehicle-specific lamp 10.

As such, the present disclosure is designed such that each light source and reflector are efficiently arranged for each role to implement roles of the first light distribution pattern, the second light distribution pattern, and the third light distribution pattern, thereby satisfying regulations for minimizing the glare of a driver of the other vehicle and sufficiently securing illumination at the same time.

Meanwhile, the configuration of the lens 400 will be described in detail below.

The light source device 100 according to an embodiment of the present disclosure may include the first lens 410 formed symmetrically about the optical axis AX of the light source device 100, and the second lens 420 disposed in front of the first lens 410 and formed asymmetrically about the optical axis AX.

In more detail, the first lens 410 may be disposed in front of the light source device 100 and may be formed to have a thinner thickness from the center to both sides end based on left and right directions.

In detail, both an incident surface 411 and an emission surface 412 of the first lens 410 may be formed as a spherical surface having a convex shape, and thus the thickness of the first lens 410 in a direction of the optical axis AX may be reduced as a distance from the optical axis AX increases. For example, the first lens 410 may be symmetrical about the optical axis AX.

The second lens 420 may be disposed in front of the first lens 410 and may be formed bent so as to be disposed rearward from one end to the other end based on left and right directions.

In detail, the second lens 420 may be formed to be curved to get closer to the light source device 100 from one end to the other end based on left and right directions, and thus the second lens 420 may be asymmetric about the optical axis AX. Here, the second lens 420 may be formed to be curved, and may be formed continuously without a stepped portion. The vehicle-specific lamp 10 according to an embodiment of the present disclosure may be differentiated in design by implementing the continuity of the second lens 420, which is positioned in the front and forms the appearance of the vehicle-specific lamp 10.

For example, the vehicle-specific lamp 10 according to an embodiment of the present disclosure may be installed on left and right sides of a vehicle. The second lens 420 may be formed to get closer to the light source device 100 from the center of the vehicle to the outside of the vehicle. That is, the second lens 420 may be formed bent toward the rear from an inboard side of a vehicle to an outboard side of the vehicle.

Also, the lens 400 may form the single focal point 'F' by the first lens 410 and the second lens 420. Accordingly, it is possible to prevent the sense of disconnection from occurring due to a different shape or a stepped shape of the first lens 410 or the second lens 420.

For example, when the lens 400 is designed to be separated into an area for forming the first light distribution pattern and an area for forming the second light distribution pattern, the lens 400 may be designed to form different focal points for each area, and thus a boundary surface may be formed for each area. As a result, a disconnected image may be formed. In this case, a defect in the design of a lamp may occur. Because the present disclosure is designed such that a single common focus is formed by the lens 400, a continuous image of the lens 400 may be implemented, thereby improving the lamp exterior design.

In the meantime, the left-right width of the first lens 410 may be formed to be the same as the left-right width of the second lens 420. This may be to secure the continuous image of the lens 400. However, the present disclosure is not limited to a case that the left-right width of the first lens 410 is the same as the left-right width of the second lens 420. For example, the left-right width of the second lens 420 may be formed to be greater than the left-right width of the first lens 410.

The horizontal curvature of the incident surface 411 of the first lens 410 may be formed to be smaller than the horizontal curvature of the emission surface 412 of the first lens 410. Hereinafter, a horizontal curvature means a curvature in the Y-axis direction, which is a left and right direction. Moreover, a vertical curvature means a curvature in the Z-axis direction.

In detail, in the first lens 410, a horizontal curvature radius of the incident surface 411 may be greater than the horizontal curvature radius of the emission surface 412. AS such, the thickness of the first lens 410 may be minimized because the curvature of the incident surface 411 is formed to be smaller than the curvature of the emission surface 412 based on the left-right direction.

Moreover, the vertical curvature of the incident surface 411 of the first lens 410 may be greater than the vertical curvature of the emission surface 412 of the first lens 410.

In detail, in the first lens 410, the vertical curvature radius of the incident surface 411 may be formed to be smaller than the vertical curvature radius of the emission surface 412. Accordingly, the first lens 410 may minimize image distortion even at a low height.

Moreover, the horizontal curvature and vertical curvature of the incident surface 411 of the first lens 410 may be formed differently from each other. The horizontal curvature and vertical curvature of the emission surface 412 of the first lens 410 may be formed differently from each other. That is, the incident surface 411 of the first lens 410 may be formed such that a horizontal curvature is different from a vertical curvature. The emission surface 412 of the first lens 410 may be formed such that a horizontal curvature is different from a vertical curvature. Accordingly, the first lens 410 may be minimized.

In the meantime, the horizontal curvature of the incident surface 421 of the second lens 420 may be formed to be the same as the horizontal curvature of the emission surface 422 of the second lens 420. Besides, the vertical curvature of an incident surface 421 of the second lens 420 may be formed to be the same as the vertical curvature of an emission surface 422 of the second lens 420.

In detail, the first lens 410 may have an optical characteristic that changes a propagation direction of light to form a predetermined light distribution pattern. On the other hand, the second lens 420 may be a lens through which light passing through the first lens 410 is incident and emitted to the outside, and may be a lens that determines an external design shape of the vehicle-specific lamp 10. As such, the horizontal curvature of the incident surface 421 of the second lens 420 may be the same as the horizontal curvature of the emission surface 422 of the second lens 420. The vertical curvature of the incident surface 421 of the second lens 420 may be the same as the vertical curvature of the emission surface 422 of the second lens 420.

Moreover, the horizontal curvature and vertical curvature of the incident surface 421 of the second lens 420 may be formed differently from each other. Furthermore, the horizontal curvature and vertical curvature of the emission surface 422 of the second lens 420 may be formed differently from each other. That is, the vertical curvature of the incident surface 421 of the second lens 420 may be different from the vertical curvature of the emission surface 422 of the second lens 420.

The second lens 420 may be formed such that a thickness in a direction from the incident surface 421 toward the emission surface 422 is uniformly formed over the entire area. As described above, the appearance of the vehicle-specific lamp 10 according to an embodiment of the present disclosure may implement a continuous image, by uniformly forming the second lens 420 forming the exterior of the lamp over the entire area.

Here, the fact that a thickness is uniform does not mean only a case where the thickness in a direction from the incident surface 421 toward the emission surface 422 is exactly uniform over the entire area. For example, a difference in thickness within a tolerance (e.g., within about 2 mm) occurring during a manufacturing process may be regarded that a thickness is uniform, based on a person skilled in the art in the technical field to which the present disclosure belongs.

The size of a lens may be minimized by forming curvatures of the first lens 410 and the second lens 420 as described above, and thus the continuity of an image may be realized while the vehicle-specific lamp 10 is miniaturized.

In the meantime, a distance h22 from an upper end of the emission surface of the second lens 420 to a lower end thereof may be smaller or less than a distance from an upper end of each of the incident surface 421 of the second lens 420, the emission surface 412 of the first lens 410, and the incident surface 411 of the first lens 410 to the lower end thereof.

Because the emission surface 422 of the second lens 420 is exposed to the outside, a lamp image of a slim design may be formed by making a height between an upper end and a lower end of the emission surface 422 of the second lens 420 smaller than other surfaces. Moreover, the incident surface 421 of the second lens 420, the emission surface 412 of the first lens 410, and the incident surface 411 of the first lens 410, which are not exposed to the outside, may have sufficient heights, thereby improving the optical efficiency of the vehicle-specific lamp 10.

For example, the distance h22 from an upper end of the emission surface 422 of the second lens 420 to a lower end thereof may be formed as 12 mm; a distance h11 from an upper end of the incident surface 411 of the first lens 410 to a lower end thereof may be formed as 14 mm; a distance h12 from an upper end of the emission surface 412 of the first lens 410 to a lower end thereof may be formed as 14 mm; and a distance h21 from an upper end of the incident surface 421 of the second lens 420 to a lower end thereof may be formed as 14 mm.

However, values of the first lens 410 and the second lens 420 may not be limited to those described above, and may be changed in various ways depending on the size and design specifications of the vehicle-specific lamp 10.

Meanwhile, the first lens 410 and the second lens 420 may include inclined surfaces on upper and lower surfaces such that the upper and lower surfaces are convex.

In detail, an upper surface of the first lens 410 may include a first upper inclined surface 413 extending from an upper end portion of the incident surface 411 and inclined upward, an upper horizontal surface 414 horizontally extending from an end portion of the first upper inclined surface 413, and a second upper inclined surface 415 inclined downward from an end portion of the upper horizontal surface 414 toward the emission surface 412.

Moreover, a lower surface of the first lens 410 may include a first lower inclined surface 417 extending from a lower end portion of the incident surface 411 and inclined downward, a lower horizontal surface 418 horizontally extending from an end portion of the first lower inclined surface 417, and a second lower inclined surface 419 inclined upward from the lower horizontal surface 418 toward the emission surface 412.

For example, the lower horizontal surface 418 may be formed with a smaller area than the upper horizontal surface 414. However, shapes of the lower horizontal surface 418 and the upper horizontal surface 414 are not limited to the illustrated embodiment.

As a result, a surface to which a gradient is applied may be formed on the upper and lower surfaces of the first lens 410.

Besides, an upper surface of the second lens 420 may include a first upper gradient surface 425 extending from an upper end portion of the incident surface 421 and inclined upward, and a second upper gradient surface 426 inclined downward from the first upper gradient surface 425 toward the emission surface 422.

Moreover, a lower surface of the second lens 420 may include a first lower gradient surface 427 extending from a lower end portion of the incident surface 421 and inclined downward, and a second lower gradient surface 428 inclined upward from the first lower gradient surface 427 toward the emission surface 422.

As a result, a surface to which a gradient is applied may be formed on the upper and lower surfaces of the second lens 420.

As such, light splashing on the upper and lower surfaces of each of the first lens 410 and the second lens 420 may be minimized by applying a gradient of a predetermined angle to the upper and lower surfaces of the first lens 410 and the second lens 420 by the inclined surface. In detail, because the first lens 410 and the second lens 420 are thick, the light splashing caused by surface reflection may be minimized when gradients are applied to the upper and lower surfaces.

For example, when the upper and lower surfaces of each of the first and second lenses are formed to be flat, the light splashing may be generated by surface reflection due to the thick thickness of the first and second lenses. The quality of the vehicle-specific lamp 10 may be degraded by such the light splashing.

According to an embodiment of the present disclosure, the light splashing may be corrected and the quality of the product may be improved by forming convexly inclined surfaces on the upper and lower surfaces of each of the first lens 410 and the second lens 420.

In accordance with a vehicle-specific lamp according to the embodiment of the present disclosure, the sense of disconnection due to a shape having a step in a slim lamp may be minimized by forming a single focus by using a first lens and a second lens, and implementing the continuity of the second lens forming an exterior appearance. Accordingly, according to an embodiment of the present disclosure, the continuity of the lens may be implemented at a low height, and thus design may be differentiated, and thus the competitiveness of a product may increase.

According to an embodiment of the present disclosure, through the design of the arrangement of a plurality of light sources and the arrangement and shape of a plurality of reflectors, illumination is sufficiently secured at the same time while regulations are satisfied by minimizing the glare of a driver of a preceding vehicle.

As described above, although specific embodiments of the present disclosure have been described above, the spirit and scope of the present disclosure is not limited to these specific examples. Various modifications and variations are possible within the scope that does not change the gist of the present disclosure described in claims by those skilled in the art to which the present disclosure belongs.

In accordance with a vehicle-specific lamp according to the embodiment of the present disclosure, the sense of disconnection due to a shape having a step in a slim lamp may be minimized by forming a single common focus by using a first lens and a second lens, and implementing the continuity of the second lens forming an exterior appearance.

Accordingly, according to an embodiment of the present disclosure, the continuity of the lens may be implemented at a low height, and thus design may be differentiated, and thus the competitiveness of a product may increase.

According to an embodiment of the present disclosure, through the design of the arrangement of a plurality of light sources and the arrangement and shape of a plurality of reflectors, illumination is sufficiently secured at the same time while regulations are satisfied by minimizing the glare of a driver of a preceding vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A lamp for a vehicle, comprising:

a light source device including a plurality of light sources configured to emit light;

a lens configured to transmit the light emitted from the light source device; and a reflector array including a plurality of reflectors respectively disposed corresponding to the plurality of light sources and configured to reflect the light irradiated from the plurality of light sources to form a plurality of light distribution patterns overlapping each other to form a low beam pattern, wherein the lens includes:

a first lens disposed in front of the light source device; and a second lens disposed in front of the first lens, wherein an upper surface of the first lens includes (1) a first upper inclined surface extending from an upper end portion of an incident surface of the first lens and inclined upwardly, (2) an upper horizontal surface horizontally extending from an end portion of the first upper inclined surface, and (3) a second upper inclined surface inclined downwardly from an end portion of the upper horizontal surface toward an emission surface of the first lens, and a lower surface of the first lens includes (1) a first lower inclined surface extending from a lower end portion of the incident surface of the first lens and inclined downwardly, (2) a lower horizontal surface horizontally extending from an end portion of the first lower inclined surface, and (3) a second lower inclined surface inclined upwardly from the lower horizontal surface toward the emission surface of the first lens.

2. The lamp of claim 1, wherein the light source device includes:

a first light source configured to irradiate first light having a first light distribution pattern;

a second light source disposed farther from an optical axis of the light source device than the first light source is disposed and configured to irradiate second light having a second light distribution pattern; and a third light source disposed farther from the optical axis of the light source device than the second light source is disposed and configured to irradiate third light having a third light distribution pattern, wherein the first, second and third light distribution patterns have respectively different light irradiation characteristics, and overlap each other to form the low beam pattern.

3. The lamp of claim 2, wherein the reflector array includes:

a first reflector configured to reflect the first light irradiated from the first light source;

a plurality of second reflectors disposed farther from the optical axis of the light source device than the first reflector is disposed and configured to reflect the second light irradiated from the second light source; and a plurality of third reflectors disposed farther from the optical axis of the light source device than the second reflectors are disposed and configured to reflect the third light irradiated from the third light source.

4. The lamp of claim 3, wherein the reflection distances between the light sources and the corresponding reflectors include:

a first reflection distance between the first light source and a reflective surface of the first reflector;

a second reflection distance between the second light source and a reflective surface of each of the second reflectors; and a third reflection distance between the third light source to a reflective surface of each of the third reflectors, and wherein the third reflection distance is smaller than the second reflection distance and greater than the first reflection distance.

5. The lamp of claim 3, wherein the light source distances between the light sources and the focal point of the lens include:

a first light source distance between the first light source and the focal point of the lens;

a second light source distance between the second light source and the focal point of the lens, the second light source distance being less than the first light source distance;

a third light source distance between the third light source and the focal point of the lens, the third light source being greater than the second light source distance.

6. The lamp of claim 1, further comprising a shield disposed at the focal point of the lens, positioned between the light source device and the lens, and configured to block a part of the light irradiated from the light source device.

7. The lamp of claim 1, wherein the first lens tapered toward first and second lateral end portions of the first lens, and the second lens is bent rearward.

8. The lamp of claim 7, wherein the first and second lenses collectively have a common focus.

9. The lamp of claim 7, wherein the first and second lenses have the same width.

10. The lamp of claim 7, wherein the second lens is disposed to be gradually closer to the light source device from a first lateral end portion to a second end portion of the second lens.

11. The lamp of claim 7, wherein a horizontal curvature of an incident surface of the first lens is smaller than that of an emission surface of the first lens.

12. The lamp of claim 7, wherein a vertical curvature of an incident surface of the first lens is greater than that of an emission surface of the first lens.

13. The lamp of claim 7, wherein a horizontal curvature of an incident surface of the first lens is different from a vertical curvature of the incident surface of the first lens, and a horizontal curvature of an emission surface of the first lens is different from a vertical curvature of the emission surface of the first lens.

14. The lamp of claim 7, wherein a horizontal curvature of an incident surface of the second lens is identical to that of an emission surface of the second lens, and a vertical curvature of the incident surface of the second lens is greater than that of the emission surface of the second lens.

15. The lamp of claim 14, wherein:

an upper surface of the second lens includes (1) a first upper gradient surface extending from an upper end portion of an incident surface of the second lens and inclined upwardly, and (2) a second upper gradient surface inclined downwardly from the first upper gradient surface toward an emission surface of the second lens, and a lower surface of the second lens includes (1) a first lower gradient surface extending from a lower end portion of the incident surface of the second lens and inclined downwardly, and (2) a second lower gradient surface inclined upwardly from the first lower gradient surface toward the emission surface of the second lens.

16. The lamp of claim 7, wherein a horizontal curvature of an incident surface of the second lens is different from a vertical curvature of the incident surface of the second lens, and a horizontal curvature of an emission surface of the second lens is different from a vertical curvature of the emission surface of the second lens.

17. The lamp of claim 7, wherein a distance between an incident surface and an emission surface of the second lens is uniform.

18. The lamp of claim 7, wherein a first distance between an upper end of an emission surface of the second lens to a lower end of the emission surface of the second lens is less than a second distance respectively between (1) an upper end portion of each of an incident surface of the second lens, an emission surface of the first lens, and an incident surface of the first lens and (2) a lower end portion of each of the incident surface of the second lens, the emission surface of the first lens, and the incident surface of the first lens.

19. The lamp of claim 7, wherein the second lenses include convex upper and lower surfaces.

* * * * *